US010252601B2

(12) United States Patent
Meller

(10) Patent No.: US 10,252,601 B2
(45) Date of Patent: Apr. 9, 2019

(54) LAMINATED GLASS PANEL ASSEMBLY AND METHOD FOR DETECTING HIDDEN INDEX FEATURE ON THE SAME

(71) Applicant: GM GLOBAL TECHNOLOGY OPERATIONS LLC, Detroit, MI (US)

(72) Inventor: David G. Meller, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 25 days.

(21) Appl. No.: 15/671,984

(22) Filed: Aug. 8, 2017

(65) Prior Publication Data

US 2019/0047379 A1 Feb. 14, 2019

(51) Int. Cl.
| | | |
|---|---|---|
| *B60J 1/00* | (2006.01) | |
| *B60J 1/02* | (2006.01) | |
| *B32B 17/10* | (2006.01) | |
| *C03C 17/00* | (2006.01) | |
| *B60R 1/04* | (2006.01) | |
| *B60R 11/00* | (2006.01) | |
| *B62D 65/06* | (2006.01) | |
| *B25J 9/16* | (2006.01) | |

(52) U.S. Cl.
CPC ............ *B60J 1/02* (2013.01); *B25J 9/1697* (2013.01); *B32B 17/10339* (2013.01); *B32B 17/10761* (2013.01); *B60R 1/04* (2013.01); *B60R 11/00* (2013.01); *B62D 65/06* (2013.01); *C03C 17/002* (2013.01); *B32B 2605/006* (2013.01); *B60R 2011/0026* (2013.01); *C03C 2218/119* (2013.01)

(58) Field of Classification Search
CPC ..... B60J 1/02; B25J 9/1697; B32B 17/10339; B32B 17/10761; B32B 2605/006; B60R 1/04; B60R 11/00; B60R 2011/0026; B62D 65/06; C03C 17/002; C03C 2218/119
See application file for complete search history.

(56) References Cited

U.S. PATENT DOCUMENTS

| | | | |
|---|---|---|---|
| 9,023,463 B2 * | 5/2015 | Lin | B32B 17/10761 428/212 |
| 2017/0259540 A1 * | 9/2017 | Wade | B32B 27/308 |
| 2017/0361579 A1 * | 12/2017 | Chen | B32B 17/10761 |
| 2017/0363863 A1 * | 12/2017 | Chen | G02B 27/0018 |
| 2018/0304591 A1 * | 10/2018 | Lu | B32B 17/10761 |

* cited by examiner

*Primary Examiner* — Lori L Lyjak
(74) *Attorney, Agent, or Firm* — Quinn IP Law

(57) ABSTRACT

A method of fabricating a laminated glass panel assembly having inner and outer glass layers includes masking a designated area of the inner glass layer to define an index feature and printing a first blackout layer onto the inner glass layer such that the first blackout layer is not present on the index feature. The method may include unmasking the index feature after printing the first blackout layer, then printing a second blackout layer onto a major surface of the outer glass layer. The major surface overlaps or covers the index feature such that the index feature is not visible to a human observer through the outer glass layer, but is detectable through the outer glass layer using a controller and machine vision logic. A glass panel assembly having the index feature is also described herein, as is a system for making the glass panel assembly.

18 Claims, 2 Drawing Sheets

LAMINATED GLASS PANEL ASSEMBLY AND METHOD FOR DETECTING HIDDEN INDEX FEATURE ON THE SAME

INTRODUCTION

Vehicle bodies are configured to receive and support windshields, sunroofs, side and rear windows, and other panels of glass. For instance, a windshield of a motor vehicle may be constructed from multiple layers of laminated glass. A thin layer of polyvinyl butyral (PVB) may be sandwiched between layers of clear glass, with the inner PVB layer bonding the glass layers together while forming a barrier to incident rocks or road debris. Hardware in the form of sensors, brackets, fasteners, and windshield moldings is then integrated with the windshield glass to form a windshield assembly. Machine vision systems may be used during the manufacturing process to facilitate the precise location of such hardware.

SUMMARY

A method for fabricating a laminated glass panel assembly is disclosed herein. The panel assembly has inner and outer glass layers. According to an example embodiment, the method includes masking a designated area of the inner glass layer to define an index feature, and thereafter forming a first blackout layer on the inner glass layer such that the first blackout layer is not formed on or over the index feature. The index feature is then unmasked. A second blackout layer is formed on the outer glass layer to cover or overlap the designated area such that the index feature is hidden from external view, i.e., is not visible by a human observer through the outer glass layer.

The method further includes determining a position of the hidden index feature using light and a vision system, and then connecting a hardware component to the inner glass layer using the determined position. The hardware component may include a bracket and/or a plurality of fasteners, such as a rearview mirror assembly bracket and fasteners for mounting a sensor housing to a windshield-variant of the glass panel assembly.

Determining the position of the hidden index feature may include irradiating the hidden index feature with light having an intensity or brightness of at least 250 lumens.

The hidden index feature may include one or more circular areas or spots in certain embodiments, without limiting the present disclosure to such a shape.

A laminated glass panel assembly is also disclosed that includes inner and outer glass layers. The inner glass layer has a first major surface, with a first blackout layer formed on the first major surface. The first blackout layer is not present on a designated area, with the designated area thereby defining an index feature. The outer glass layer has a second major surface with a second blackout layer. The second major surface covers/overlaps the index feature such that the index feature is effectively hidden, i.e., not visible to a human observer through the outer glass layer. The hidden index feature later becomes detectable by a controller using machine vision logic when the glass panel assembly is illuminated with high-intensity light.

The hidden index feature may be positioned at an upper-center position of the glass panel assembly. The glass panel assembly may be embodied as a windshield assembly, in which case the assembly may also include a rear view mirror assembly and/or sensor housing mounted to the inner glass layer.

Additionally disclosed is a system for fabricating the laminated glass panel assembly. The system may include a robot having a camera operable for collecting pixel images of the hidden index feature, a light source positioned adjacent to the panel assembly and configured to output light of at least 250 lumens, and a controller. The controller, which is in communication with the robot, has vision system logic, with the controller configured to determine a position of the hidden index feature through the outer glass layer using the vision system after the windshield assembly is illuminated via the light source. The controller is also configured to command the robot to connect a hardware component to the inner glass layer using the determined position.

The robot may include an end-effector configured to attach a bracket or a plurality of fasteners as the hardware component.

The above-noted and other features and advantages are apparent from the following detailed description of the best modes for carrying out the disclosure when taken in connection with the accompanying drawings.

Figure 1:
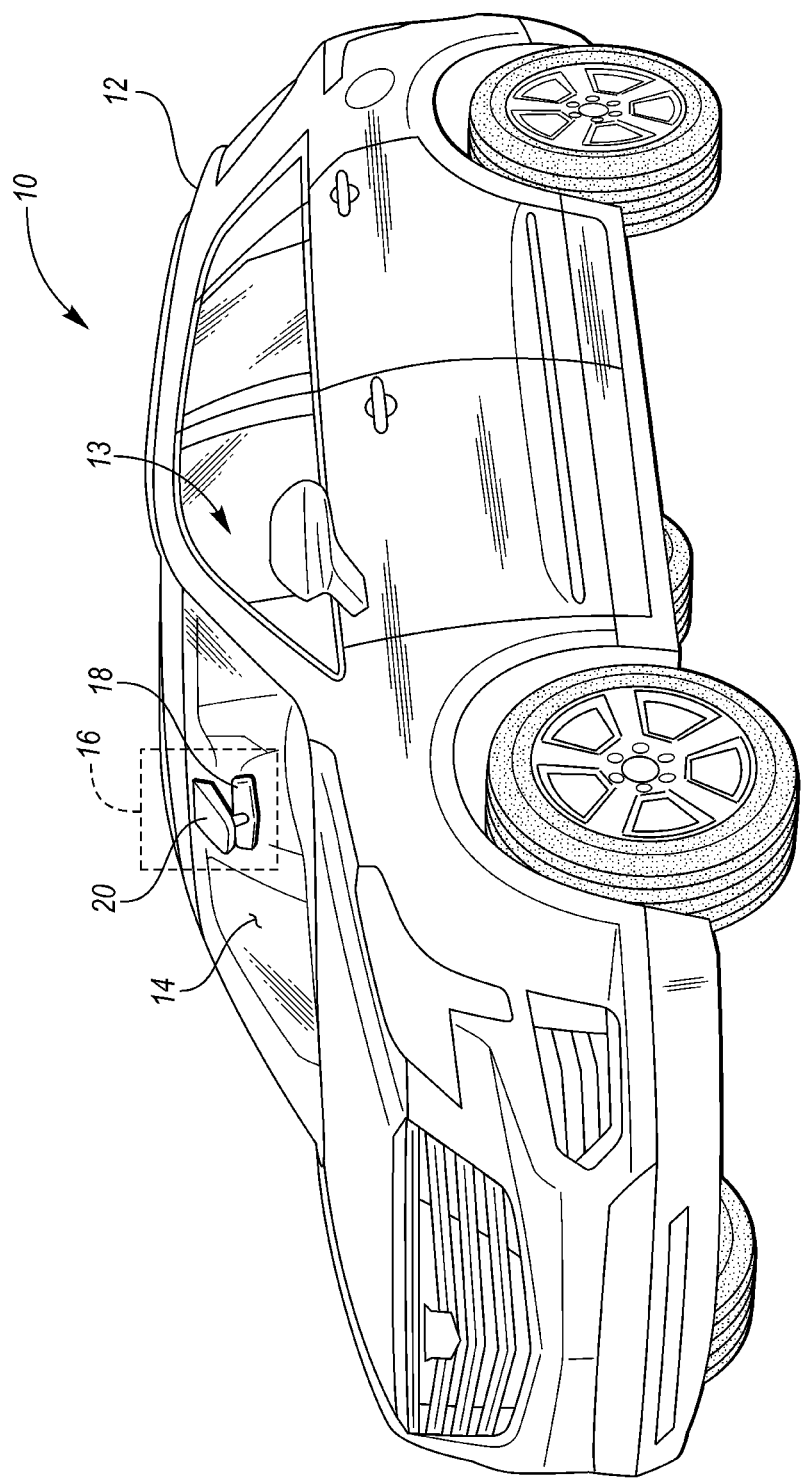
FIG. 1 is a schematic perspective view illustration of an example motor vehicle having a laminated glass panel assembly with blackout material and a hidden index feature constructed as disclosed herein.

The present disclosure is susceptible to various modifications and alternative forms. Representative embodiments provide non-limiting illustrative examples in the drawings as described in detail herein. Novel aspects of this disclosure are not limited to the particular forms illustrated in the drawings. Rather, the disclosure is intended to cover modifications, equivalents, combinations, or alternatives falling within the spirit and scope of the disclosure as defined by the appended claims.

DETAILED DESCRIPTION

Referring to the drawings, wherein like reference numbers refer to the same or similar components throughout the several views, an example vehicle 10 is depicted in FIG. 1. The vehicle 10 includes a vehicle body 12 defining a passenger compartment 13. A laminated glass panel assembly 14, shown as a non-limiting example windshield assembly, is secured to the vehicle body 12 via a weatherproof perimeter gasket (not shown). The vehicle 10 may be variously embodied as a passenger, commercial, or industrial vehicle, a mobile platform, farm equipment, marine vessel, or aircraft without departing from the intended inventive scope.

A rearview mirror assembly 18 and a sensor housing 20 may be mounted to the panel assembly 14 within the passenger compartment 13 at a center-top area 16 of the panel assembly 14. The sensor housing 20 may be a plastic enclosure containing a sensor suite such as electro-optical or radar cameras, rain sensors, transceivers, and/or temperature sensors, and shielding such sensors and associated wiring from view from occupants of the vehicle 10.

Figure 2:
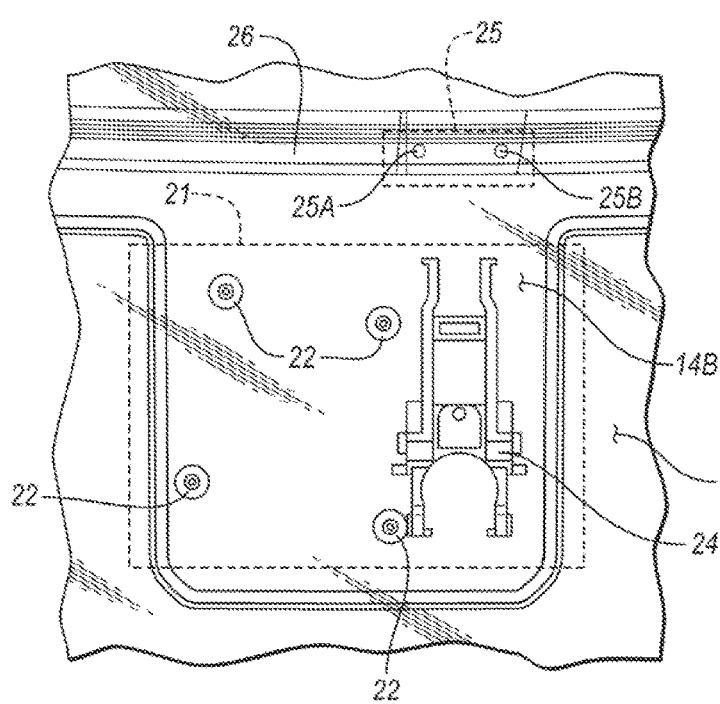
FIG. 2 is a schematic plan view illustration of a portion of the example panel assembly shown in FIG. 1.
Figure 2A:
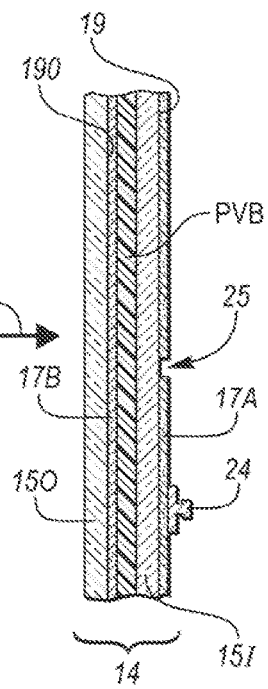
FIG. 2A is a schematic side view illustration of a portion of the panel assembly of FIGS. 1 and 2.

Referring to FIG. 2A, the laminated glass panel assembly 14 of FIG. 1 may be constructed from multiple different layers of laminated glass of the type described above, i.e., a polyvinyl butyral (PVB) layer positioned between respective opposing inner and outer layers 15I and 15O of clear glass. As the panel assembly 14 is manufactured, the inner and outer layers 15I and 15O may undergo a coating process. For example, a translucent layer of suitable tinting or blackout material, shown as blackout layers 17A and 17B, may be applied to the edges of the panel assembly 14 to facilitate adhesive bonding of the panel assembly 14 to the vehicle body 12 of FIG. 1. Black enamel is a common type of material used for this purpose. The blackout layers 17A and 17B may be applied in a two-layer printing process in which the material is printed directly onto the panel assembly 14, with the blackout layers 17A and 17B possibly acting as an ultraviolet radiation shield to help protect and conceal structure of the panel assembly 14 and block glare.

The blackout layers 17A and 17B may extend from an upper perimeter edge of the panel assembly 14 to cover the center-top area 16 of FIG. 1 in proximity to the rear view mirror assembly 18 and the sensor housing 20 to help obscure such structure from view. Due to the location of the blackout layers 17A and 17B relative to a human observer positioned outside of the vehicle 10 and viewing the panel assembly 14 from the perspective of arrow B in FIG. 2A, an index feature 25 constructed as described below with reference to FIG. 2 is hidden from view, i.e., is not readily visible to a human observer. While the index feature 25 is effectively hidden from view, the locating function of the index feature 25 to locate and install a bracket 24 or other hardware during a hardware mounting process 30 is preserved, as described below with reference to FIG. 3.

Figure 3:
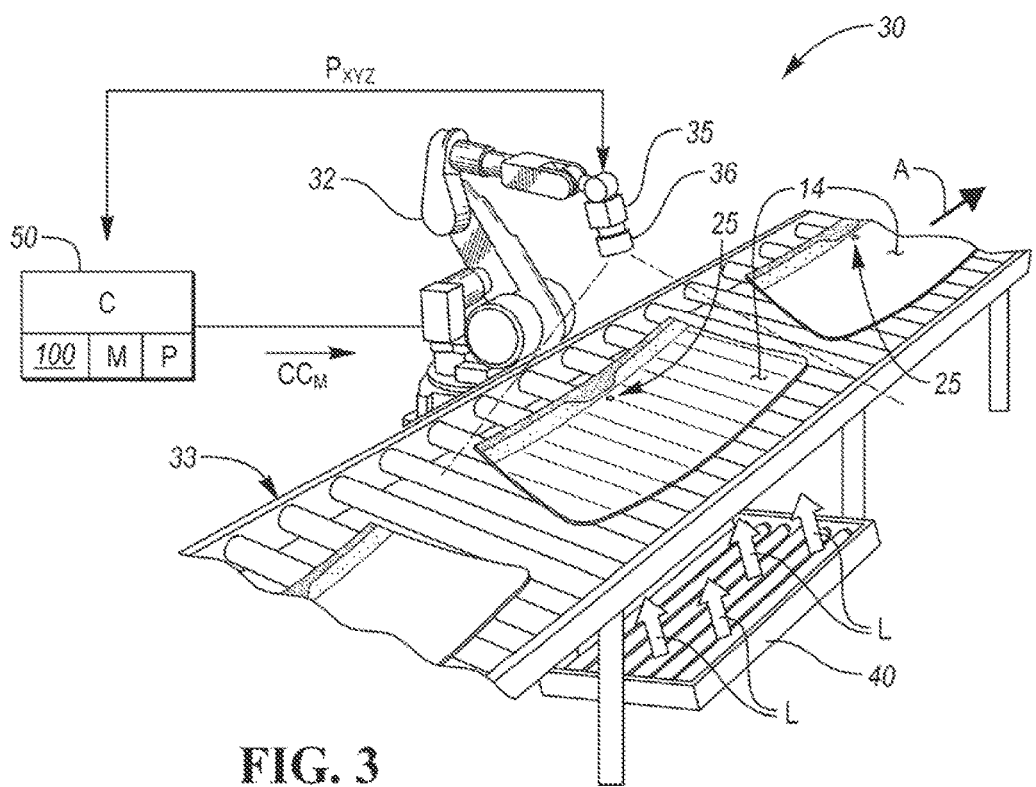
FIG. 3 is a schematic illustration of an example vision system-based hardware mounting process for constructing the panel assembly shown in FIGS. 1 and 2.

In order to precisely mount the rearview mirror assembly 18 and the sensor housing 20 to the laminated glass panel assembly 14 of FIG. 1, and prior to attaching the perimeter of the panel assembly 14 to the vehicle body 12, the panel assembly 14 may first undergo the hardware mounting process 30 depicted schematically in FIG. 3. Example windshield hardware is shown in FIG. 2, in which portions of the panel assembly 14 are coated with black epoxy or other suitable blackout material during the two-layer blackout printing process noted above. The blackout material 17A and 17B shown in FIG. 2A together form a translucent blackout portion 14B, with a clear/transparent portion 14C of the panel assembly 14 positioned adjacent to the blackout portion 14B. Plastic molding or windshield trim 26 may optionally surround the blackout portion 14B as shown once the panel assembly 14 is fully assembled.

The example windshield hardware is shown in a hardware mounting zone 21 as an optional set of fasteners 22, e.g., posts or mounting studs that are ultimately engaged with mating fasteners (not shown) on the sensor housing 20 of FIG. 1. A bracket 24 for securing the rear view mirror assembly 18 of FIG. 1 to the glass of the panel assembly 14 may be fastened or bonded to the panel assembly 14 within the hardware mounting zone 21. Each piece of windshield hardware present in the hardware mounting zone 21 may be machine-installed, e.g., using a multi-axis industrial robot such as the robot 32 of FIG. 3, so as to ensure precise and repeatable positioning of the fasteners 22, bracket 24, or other hardware.

Machine installation of the hardware shown in FIG. 2 may be assisted by a vision system as described below with reference to FIG. 3. As part of such a process, images of the hardware mounting zone 21 may be processed to determine the two-dimensional or three-dimensional coordinates of each hardware piece with respect to a calibrated reference position, with the reference position being the coordinates of the index feature 25, e.g., a pair of index features 25A and 25B in the example illustration of FIG. 2, which may be circular, linear, X-shaped, square, or another suitable shape in various embodiments.

The index features 25A and 25B may be formed in the blackout area 14B during the two-layer blackout printing process and later obstructed from view from the passenger compartment 13 of FIG. 1 by the trim pieces 26. As set forth herein, the index features 25A and 25B are embodied as a clear uncoated areas or spots on the inner layer 15I (see FIG. 2A) of the panel assembly 14, or a linear hash mark/tick mark or other suitable area that is not coated with the blackout material 17A. Blackout material 17A is still applied to an adjacent outer layer of the panel assembly 14, such that the index feature 25 is not visible outside of the vehicle 10 of FIG. 1 when looking through the panel assembly 14. The index feature 25 is also hidden from view within the passenger compartment by interposition of the trim 26 of FIG. 2.

For instance, the above-described index feature 25 may be formed during manufacturing of the panel assembly 14, and in particular during the two-layer blackout process. Formation may include masking one or more small circular areas or linear hash marks/tick marks or other minor surface area of a major surface 19 of an inner glass layer 15I of the panel assembly 14. Such a process could include applying a removable screen, template, shield, or other mask that blocks contact of the blackout material 17A with the inner layer 15I when applied. Then, as the blackout layer 17A of FIG. 2A is formed on the major surface 19 of the inner glass layer 15I, the blackout layer 17A is not printed onto the masked area.

Thereafter, the method may include unmasking the previously-masked minor surface area, i.e., the area corresponding to the index feature 25, prior to printing the blackout layer 17B onto a major surface 190 of the outer glass layer 15O. The major surface 190 of the outer glass layer 15O overlaps or covers the minor surface area/index feature 25, i.e., the major surface 190 is disposed between an observer positioned external to the vehicle 10 and the index feature 25. As a result, such an observer sees the material of blackout layer 17B and not the index feature 25 when viewing an area corresponding to the index feature 25. However, because the blackout material 17A does not cover the index feature 25 on the inner layer 15I, the hardware mounting process 30 of FIG. 3 remains available for placement of the example windshield hardware shown in FIG. 2.

Referring to FIG. 3, the hardware mounting process 30 noted briefly above may be conducted using the robot 32, e.g., a 6-axis or other multi-axis industrial robot responsive to motion control signals (arrow $CC_M$) from a controller (C) 50. While shown as a floor-mounted robot, the robot 32 may be suspended overhead in other embodiments, such as from rails or a gantry system, such that an end-effector 36 of the robot 32 performing the requisite hardware mounting steps, e.g., drilling, gluing, etc., is free to translate and rotate to a commanded position in response to the motion control signals (arrow $CC_M$). The controller 50 may be embodied as one or more computer devices having requisite memory (M) and a processor (P) respectively storing and executing algorithms/software for controlling the robot 32, as well as other associated hardware, e.g., a clock or timer, input/output circuitry, etc. Memory (M) includes sufficient amounts of read only memory (ROM), for instance magnetic or optical memory.

As part of the hardware mounting process 30, the robot 32 may operate on the laminated glass panel assemblies 14 as a series of the assemblies 14 move along a conveyor belt 33 in the direction of arrow A, i.e., as part of a moving production line process. Alternatively, the robot 32 may move with respect to the panel assemblies 14 while the panel assemblies 14 remain stationary. The robot 32 may be equipped with a vision system camera 35 in communication with the controller 50, which in turn is programmed with corresponding vision system logic 100.

As part of the hardware mounting process 30, the vision system camera 35 images or scans the laminated glass panel assembly 14 and, using the vision system logic 100, detects areas of contrast. The corresponding positions of the areas of contrast are then reported to the controller 50 as position data (arrow $P_{XYZ}$). In this manner, the controller 50 is configured to use machine vision functionality as part of the overall hardware mounting process 30. By way of example, the vision system camera 35 may capture and convert light into an electrical signal, which is then digitized into a pixel array and processed by the controller 50 to determine the corresponding three-dimension coordinates of the index feature 25.

In particular, prior to installing the example windshield hardware shown in FIG. 2 the controller 50 operates the vision system camera 35 and uses the vision system logic 100 to detect the index feature 25 on the panel assembly 14. As noted above, the index feature 25 is not visible through the blackout layer 17B of FIG. 2A. Therefore, the hardware mounting process 30 includes illuminating an underside (i.e., passenger compartment 13-facing surface) of the panel assembly 14 with light (arrow L) from a high-intensity light source 40.

For example, a panel of light-emitting diodes (LEDs) or incandescent or halogen bulbs may be energized such that high-intensity light (arrows L) shines through the index feature 25 in a direction diametrically opposite to the direction indicated by arrow B in FIG. 2B. As used herein, the meaning of the term "high-intensity" may vary with the thickness and material type of the blackout layer 17B through which the light (arrows L) passes, as well as the sensitivity of the vision system camera 35. By way of a non-limiting example, the light (arrow L) of at least 250 lumens may be satisfactory when concentrated and directed into the index feature 25. If the light (arrow L) is diffused, however, or if the light source 40 is placed farther from the panel assembly 14, then high-intensity light of 1000 lumens or more may be used. Other approaches may include the use of high-intensity strobe lights or spot lights.

After forming the index feature 25, now hidden, the method described herein may include determining a position of the minor surface area corresponding to the index feature 25 using the light (arrow L) emitted by the lighting source 40 and a vision system, i.e., the vision system camera 35 and the associated vision system logic 100. Once the position of the index feature 25 is communicated to the controller 50, the controller 50 is operable for commanding the robot 32 to connect a hardware component to the panel assembly 14 using the determined position. That is, the determined position of the index feature 25 becomes a reference point from which the controller 50 calculates the required corresponding location of the hardware, and thereafter controls the end-effector 36 of FIG. 3 to attach the hardware.

In addition to the above-described benefits, placement of the index feature 25 as shown in FIG. 2A is that precision of alignment to other feature voids is improved, with such voids possibly including camera and/or rain sense voids. The blackout layers 17A and 17B have an alignment tolerance to their respective glass plies, and the glass plies themselves have and alignment tolerance to each other. By moving the index feature 25 onto the same glass layer as the feature voids, much of the tolerance stack-up is eliminated.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of fabricating a laminated glass panel assembly having an inner glass layer and an outer glass layer, the method comprising:
   masking a designated area of a major surface of the inner glass layer to thereby define an index feature;
   printing a first blackout layer onto the major surface of the inner glass layer such that the first blackout layer is not printed onto the designated area of the index feature;
   unmasking the designated area of the index feature after printing the first blackout layer; and
   printing a second blackout layer onto a major surface of the outer glass layer such that the major surface of the outer glass layer covers or overlaps the index feature and the index feature is not visible to a human observer through the outer glass layer.

2. The method of claim 1, further comprising:
   illuminating the panel assembly with high-intensity light;
   determining a position of the index feature through the outer glass layer using a vision system camera and a controller after illuminating the panel assembly; and
   connecting a hardware component to the inner glass layer using the determined position.

3. The method of claim 2, wherein the panel assembly is a windshield assembly and the hardware component is a rear view mirror bracket.

4. The method of claim 2, wherein the panel assembly is a windshield assembly and the hardware component is a plurality of fasteners configured to mount a sensor housing.

5. The method of claim 2, wherein determining the position of the index feature includes irradiating the index feature with light having an intensity of at least 250 lumens.

6. The method of claim 5, wherein determining the position of the index feature includes irradiating the index feature with light having an intensity of at least 1000 lumens.

7. The method of claim 1, wherein the index feature includes a plurality of index features.

8. The method of claim 7, wherein the plurality of index features includes a plurality of circular areas or spots.

9. A laminated glass panel assembly comprising:
   an inner glass layer having a first major surface and a first blackout layer printed onto the first major surface, wherein the first blackout layer is not present on a designated area defining an index feature; and
   an outer glass layer having a second major surface and a second blackout layer printed onto the second major surface, the second blackout layer covering or overlapping the index feature such that the index feature is not visible to a human observer through the outer glass layer, and is such that the index feature is detectable through the outer glass layer by a controller using a vision system camera and machine vision logic when the panel assembly is illuminated with high-intensity light.

10. The panel assembly of claim 9, wherein the panel assembly is a windshield assembly, the panel assembly further comprising one or both of a rear view mirror assembly and a sensor housing mounted to the inner glass layer.

11. The panel assembly of claim 9, wherein the index feature includes a plurality of index features.

12. The panel assembly of claim 11, wherein the panel assembly is a windshield assembly, and wherein the plurality of index features are positioned at an upper-center position of the panel assembly.

13. A system for fabricating a laminated glass panel assembly having an inner glass layer and an outer glass layer, the inner glass layer having a first major surface and a first blackout layer printed onto the first major surface, wherein the first blackout layer is not present on a designated area defining an index feature, and an outer glass layer having a second major surface and a second blackout layer printed onto the second major surface, the second major surface covering or overlapping the index feature such that the index feature is not visible to a human observer through the outer glass layer, the system comprising:
- a robot having a vision system camera operable for collecting pixel images of the index feature;
- a light source positioned adjacent to the glass panel assembly and configured to output light of at least 250 lumens; and
- a controller in communication with the robot and having vision system logic, wherein the controller is configured to determine a position of the index feature through the outer glass layer using the vision system logic and the collected pixel images after the glass panel assembly is illuminated with the light from the light source, and to thereafter command the robot to connect a hardware component to the inner glass layer using the determined position.

14. The system of claim 13, wherein the glass panel assembly is a windshield assembly and the robot has an end-effector configured to attach a rear view mirror bracket or a plurality of sensor housing mounting fasteners to the windshield assembly as the hardware component.

15. The system of claim 13, wherein the light source is a light-emitting diode (LED) light panel.

16. The system of claim 13, wherein the light source includes a strobe light.

17. The system of claim 13, wherein the light source has an intensity of at least 1000 lumens.

18. The system of claim 13, wherein the index feature includes a plurality of index features.

* * * * *